US012804039B2

(12) United States Patent
Yu et al.

(10) Patent No.: US 12,804,039 B2
(45) Date of Patent: Nov. 17, 2026

(54) METHOD FOR PROCESSING A DOMAIN NAME RESOLUTION REQUEST, ELECTRONIC DEVICE AND STORAGE MEDIUM

(71) Applicant: BEIJING BYTEDANCE NETWORK TECHNOLOGY CO., LTD., Beijing (CN)

(72) Inventors: Xiaoyun Yu, Beijing (CN); Yongkang Xu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 136 days.

(21) Appl. No.: 18/848,503

(22) PCT Filed: Mar. 15, 2023

(86) PCT No.: PCT/CN2023/081579

§ 371 (c)(1),
(2) Date: Oct. 16, 2024

(87) PCT Pub. No.: WO2023/202276

PCT Pub. Date: Oct. 26, 2023

(65) Prior Publication Data

US 2025/0220076 A1 Jul. 3, 2025

(30) Foreign Application Priority Data

Apr. 18, 2022 (CN) ......................... 202210437194.6

(51) Int. Cl.
*H04L 67/1097* (2022.01)
*H04L 61/10* (2022.01)

(52) U.S. Cl.
CPC .......... *H04L 67/1097* (2013.01); *H04L 61/10* (2013.01)

(58) Field of Classification Search
CPC . H04L 67/10; H04L 67/1097; H04L 61/4511; H04L 61/00; H04L 61/10
See application file for complete search history.

(56) References Cited

U.S. PATENT DOCUMENTS 11,570,278 B1 * 1/2023 Uthaman ............ H04L 41/0894
11,641,410 B1 * 5/2023 Uthaman ................ H04L 43/50
709/218

(Continued)

FOREIGN PATENT DOCUMENTS

CN 103051740 A 4/2013
CN 109040343 A 12/2018

(Continued)

OTHER PUBLICATIONS

China Patent Application No. 202210437194.6; First Office Action; dated Jan. 9, 2024; 15 pages.

(Continued)

*Primary Examiner* — Frantz B Jean
(74) *Attorney, Agent, or Firm* — BakerHostetler

(57) ABSTRACT

A method for processing a domain name resolution request is provided. The method includes: obtaining first request information of a first domain name resolution request sent by a target client, wherein the first request information comprises a domain name to be resolved carried in the first domain name resolution request, and client information of the target client; obtaining a first information set from a second server, in response to determining that first target node information corresponding to the first request information is not stored in the first server based on the domain name to be resolved and the client information, wherein the first information set is a collection of first candidate node information corresponding to the first request information; taking at least one first candidate node information in the (Continued)

first information set as the first target node information, and sending the first target node information to the target client.

20 Claims, 3 Drawing Sheets

(56) References Cited

U.S. PATENT DOCUMENTS

| | | | | |
|---|---|---|---|---|
| 11,922,074 | B1 * | 3/2024 | Thomason | G06F 3/0655 |
| 2020/0228495 | A1 | 7/2020 | Ogale et al. | |
| 2022/0239696 | A1 * | 7/2022 | Konda | H04L 61/4511 |

FOREIGN PATENT DOCUMENTS

| | | | | | |
|---|---|---|---|---|---|
| CN | 110460652 | A | | 11/2019 | |
| CN | 110769080 | A | | 2/2020 | |
| CN | 111193672 | A | | 5/2020 | |
| CN | 112887444 | A | | 6/2021 | |
| CN | 113067909 | A | | 7/2021 | |
| CN | 113099261 | A | * | 7/2021 | H04L 61/4511 |
| CN | 113194134 | A | | 7/2021 | |
| CN | 113301077 | A | * | 8/2021 | H04L 61/4511 |
| CN | 114629911 | A | | 6/2022 | |
| EP | 3668052 | A1 | | 6/2020 | |
| EP | 3813340 | A | | 4/2021 | |
| WO | WO 2019/028683 | A1 | | 2/2019 | |
| WO | WO 2021/057369 | A1 | | 4/2021 | |
| WO | WO 2021/142867 | A1 | | 7/2021 | |

OTHER PUBLICATIONS

International Patent Application No. PCT/CN2023/081579; Int'l Search Report; dated Jul. 4, 2023; 2 pages.

* cited by examiner

METHOD FOR PROCESSING A DOMAIN NAME RESOLUTION REQUEST, ELECTRONIC DEVICE AND STORAGE MEDIUM

The present disclosure is a U.S. national stage application of International Patent Application No. PCT/CN2023/081579, filed on Mar. 15, 2023, which claims priority of the Chinese Patent Application No. 202210437194.6 filed on Apr. 18, 2022, the entire disclosure of which is incorporated by reference in the present disclosure.

TECHNICAL FIELD

The present disclosure relates to the field of computer technology, for example, to a method for processing a domain name resolution request, an apparatus, a device, a medium, and a program product.

BACKGROUND

The client may request a push flow domain name or a pull flow domain name from a node-preferred server, perform Local Domain Name System (Local DNS) resolution of the requested push flow domain name or the requested pull flow domain name, and upon live demand, send a resolved Internet Protocol (IP) address list to the node-preferred server and initiate a domain name resolution request. Thus, the node-preferred server may return a preferred IP address for the client to live based on the IP addresses list sent by the client.

However, in the related art, stability when processing a domain name resolution request is poor, resulting in poor user experience.

SUMMARY

The present disclosure provides a method, an apparatus, a device, a medium and a program product for processing a domain name resolution request, to improve stability when processing the domain name resolution request.

In a first aspect, the present disclosure provides a method for processing a domain name resolution request, performed by a first server, including:

obtaining first request information of a first domain name resolution request sent by a target client, where the first request information includes a domain name to be resolved carried in the first domain name resolution request, and client information of the target client;

obtaining a first information set from a second server, in response to determining that first target node information corresponding to the first request information is not stored in the first server based on the domain name to be resolved and the client information, where the first information set is a collection of first candidate node information corresponding to the first request information;

taking at least one first candidate node information in the first information set as the first target node information, and sending the first target node information to the target client.

In a second aspect, the present disclosure further provides an apparatus for processing a domain name resolution request, configured in a first server, including:

a request information obtaining module, configured to obtain first request information of a first domain name resolution request sent by a target client, where the first request information includes a domain name to be resolved carried in the first domain name resolution request, and client information of the target client;

a node information obtaining module, configured to obtain a first information set from a second server, in response to determining that first target node information corresponding to the first request information is not stored in the first server based on the domain name to be resolved and the client information, where the first information set is a collection of first candidate node information corresponding to the first request information;

a first information sending module, configured to take at least one first candidate node information in the first information set as the first target node information, and send the first target node information to the target client.

In a third aspect, the present disclosure further provides an electronic device, including:

one or more processors; and a memory configured to store one or more programs;

the one or more programs, when executed by the one or more processors, cause the one or more processors to implement the above-mentioned method for processing a domain name resolution request.

In a fourth aspect, the present disclosure further provides a computer readable storage medium having stored thereon a computer program which, when executed by a processor, implements the above-mentioned method for processing a domain name resolution request.

In a fifth aspect, the present disclosure further provides a computer program product which, when executed by a computer, causes the computer to implement the above-mentioned method for processing a domain name resolution request.

DETAILED DESCRIPTION

Figure 1:
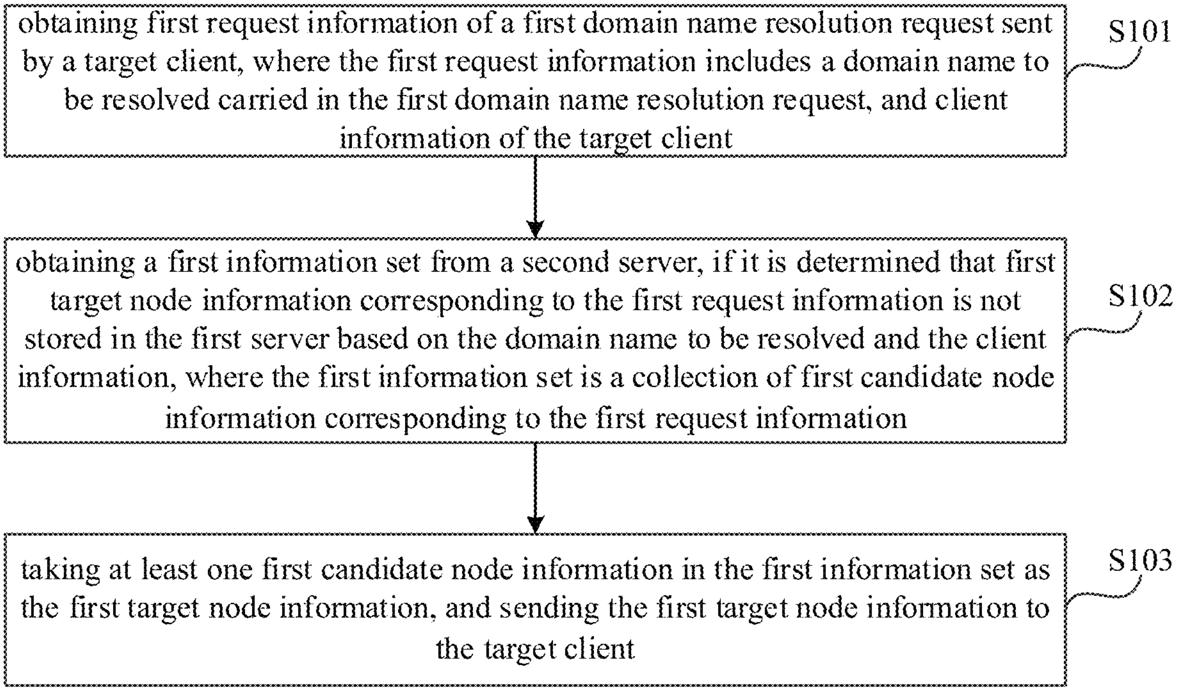
FIG. 1 is a flowchart schematic diagram of a method for processing a domain name resolution request provided by an embodiment of the present disclosure.

Embodiments of the present disclosure will be described below with reference to the accompanying drawings. While some embodiments of the present disclosure are shown in the drawings, the present disclosure may be embodied in many forms, with these embodiments being provided to provide an understanding of the present disclosure. The drawings and embodiments of the present disclosure are only for exemplary purposes.

The various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

The concepts of "first", "second", and the like mentioned in the present disclosure are only used to distinguish different devices, modules, or units, and are not used to limit the order or interdependence of functions performed by these devices, modules, or units.

Modifications referred to in this disclosure as "a", "a plurality" are illustrative rather than restrictive, and those skilled in the art should understand that unless the context clearly indicates otherwise, these modifications should be understood as "one or more."

The names of messages or information exchanged between a plurality of apparatuses in the embodiments of the present disclosure are for illustrative purposes only and are not intended to limit the scope of these messages or information.

FIG. 1 is a flowchart schematic diagram of a method for processing a domain name resolution request provided by an embodiment of the present disclosure. The method may be performed by a processing device of a domain name resolution request, where the device may be implemented by software and/or hardware, and may be configured in an electronic device. For example, the device may be configured in a computer device, such as a node-preferred server. The method for processing a domain name resolution request provided by the embodiments of the present disclosure is applicable to a scenario of conducting domain name parsing, and particularly applicable to a scenario of conducting parsing on a live domain name. As shown in FIG. 1, the method for processing a domain name resolution request provided by the embodiment may include:

- S101: obtaining first request information of a first domain name resolution request sent by a target client, where the first request information includes a domain name to be resolved carried in the first domain name resolution request, and client information of the target client.

The first domain name resolution request may be a domain name resolution request that currently needs to be processed, i.e., when processing a received domain name resolution request, the domain name resolution request may be considered the first domain name resolution request. The domain name resolution request may be a request for a first server (e.g., a node-preferred server, etc.) to assign it a node corresponding to its requested domain name. The target client may be the client that sent the first domain name resolution request.

The first request information may be related information of the first domain name resolution request, such as a domain name to be resolved carried in the first domain name resolution request and/or client information of a target client. The domain name to be resolved may be a domain name carried in the first domain name resolution request for which node information (e.g., IP address) corresponding to the domain name currently needs to be determined. One or more domain names to be resolved may be carried in the first domain name resolution request, and when a plurality of domain names to be resolved are carried, subsequent operations may be performed for each domain name to be resolved. The target client may be the client that sent the first domain name resolution request. The client information of the target client may include location information of the target client, such as identification information of the country and province in which the target client is located, and/or operator information when the target client sends the first domain name resolution request, and the like.

When a domain name resolution request (i.e., the first domain name resolution request) needs to be processed, the first domain name resolution request may be resolved to determine a domain name to be resolved requested by the first domain name resolution request, and client information of the target client, such as a country and province in which the target client is located, and operator information of the target client may be determined based on an IP address of the target client sending the domain name resolution request.

In order to shorten the time taken for processing the domain name resolution request, when processing a domain name resolution request, the target client sending the domain name resolution request and at least one domain name carried in the domain name resolution request may be filtered to reduce the number of domain name resolution requests that need to be processed/domain names to be resolved, thereby reducing the amount of operation of the first server.

For example, when the first domain name resolution request needs to be processed, it may be preferred to obtain an IP address of a target client sending the first domain name resolution request, determine whether the IP address is a private IP of the user, and if the IP address is a private IP of the user, not process the first domain name resolution request, and return a prompt message to the target client to prompt the user that the IP address of the target client is a private IP. If the IP address is not a private IP of the user, resolving the first domain name resolution request to obtain at least one domain name requested to be resolved by the first domain name resolution request, determining whether a non-existent domain name (i.e., an error domain name) is included in the determined at least one domain name. If the non-existent domain name is included in the determined at least one domain name, deleting the error domain name, and taking the remaining correct domain name as the domain name to be resolved. If the non-existent domain name is not included in the determined at least one domain name, directly treating the determined at least one domain name as the domain name to be resolved. Thus, after obtaining the domain name to be resolved, the client information of the target client may be determined based on the IP address of the target client.

In the present embodiment, whether a domain name exists or not can be determined based on a business domain name list set in advance, taking a live scene as an example, it can be judged whether the domain name is located in a live domain name list, if the domain name is located in the live domain name list, the domain name is determined to exist. If the domain name is not in the live domain name list, it is determined that the domain name does not exist, i.e., the domain name is determined to be a non-existent domain name.

- S102: obtaining a first information set from a second server, if it is determined that first target node information corresponding to the first request information is not stored in the first server based on the domain name to be resolved and the client information, where the first information set is a collection of first candidate node information corresponding to the first request information.

The first target node information corresponding to the first request information may be node information of a node corresponding to the first request information. That the node corresponds to the first request information can be understood as that the IP address of the node corresponds to the domain name to be resolved, i.e. that the IP address of the node is the IP address resolved for the domain name to be resolved. The related information of the node is the same as the client information of the target client. Taking the client information of the target client includes location information and operator information of the target client as an example, the location information of the node (e.g., identification information of country and province) is the same as the location information of the target client, and the operator information of the node is the same as the operator information of the target client. Illustratively, the target node information (including the first target node information) of a node may include an IP address of the node, and may also include a renewal time, an expiration time, and/or an Internet Protocol information of the node. The Internet protocol followed by a node may be identification information of the Internet protocol to which it follows, and it is also may be the result of a judgement of whether the node follows an Internet information, such as whether the node follows Internet Protocol Version 6 (IPV6), and the present embodiment is not limited in this respect.

The second server may be a server different from the first server, e.g., the first server may be a node-preferred server, and the second server may be a server configured for central caching, e.g., a Redis server. The first server may only be configured to cache node information corresponding to a certain number of domain names. The second server may be configured to cache node information corresponding to a plurality of domain names resolved by a third server (e.g., a remote domain name resolution server). The first information set may be a collection of a plurality of first candidate node information corresponding to the first request information, from which the first server may select first candidate node information as first target node information to send to the target client. In other words, the first candidate node information may be node information corresponding to the first request information that is available for selection by the first server, and the first target node information may be node information that the first server returns to the target client based on the first domain name resolution request. The candidate node information (including the first candidate node information) of a node may include the IP address of the node, and may also include the renewal time of the node, expiration time of the node, and/or Internet Protocol followed information followed by the node.

Exemplarily, after obtaining the first request information of the first domain name resolution request, it may be determined whether the first target node information corresponding to the first request information is stored in the first server, such as whether the first target node information of the target node corresponding to the first request information is stored in a local cache of the first server. If it is determined that the first target node information corresponding to the first request information is not stored in the first server, the first information set corresponding to the first request information may be obtained from the second server, e.g., an information acquisition request carrying the first request information may be sent to the second server, and the first information set returned by the second server based on the information acquisition request may be received.

In this embodiment, the first server may employ a Least Recently Used (LRU) caching component to maintain node information corresponding to a preset number of recently requested request information in a local cache. That is, the local cache stores a certain number (e.g., 5000, 10000, etc.) of node information corresponding to the request information, and the node information corresponding to the plurality of request information may be stored in the order of the time they were last requested, from latest to earliest.

Taking the example that the client information includes the country and province where the node is located and the operator to which the node corresponds, the first server may cache a plurality of node information with a minimum granularity of country+province+operator+domain name. To achieve a fast lookup of node information, the plurality of node information may be stored in the form of a map, e.g., node information corresponding to a plurality of request information may be stored with country+province+operator as key, with a map from domain name to node information as value. Thus, in judging whether the first target node information corresponding to the first request information is stored in the first server, it is possible to first look up the corresponding map in the local cache based on the client information in the first request information, then look up the node information corresponding to the domain name to be resolved in the first request information in the map, and determine whether the first target node information corresponding to the first request information exists in the first server according to the look-up result.

S103: taking at least one first candidate node information in the first information set as the first target node information, and sending the first target node information to the target client.

After obtaining the first information set, at least one first candidate node information in the first information set may be selected as the first target node information according to a preset selection rule, and the first target node information is sent to the target client.

When the first target node information is selected according to the preset selection rule, exemplarily, a set number (e.g., 1 or 2, etc.) of the first candidate node information may be randomly selected as the first target node information. A set number of the first candidate node information may be preferentially selected as the first target node information in the order of higher visit frequency to lower visit frequency of the nodes corresponding to the plurality of first candidate node information, so as to ensure that the nodes corresponding to the first target node information sent to the target client have higher visit frequency, i.e., to ensure that the nodes providing resources to the target client have better performance.

In the present embodiment, the first target node information corresponding to the domain name to be resolved is determined based on a plurality of node information stored in the first server and/or the second server, without having to rely on the resolution result of the Local DNS of the target client, so that the received domain name resolution request can be stably processed even when the Local DNS is hijacked by an operator or an abnormality occurs, and the stability in processing the domain name resolution request can be improved. Furthermore, since there is no need to request a remote Hyper Text Transfer Protocol DNS (Http DNS) resolution from a third server when the first server does not locally store the first target node information corresponding to the domain name to be resolved, it is also possible to increase the speed of processing the domain name resolution request and reduce the waiting time for the client.

In one implementation, the taking at least one first candidate node information in the first information set as the first target node information includes: if there is an intersection of the first information set and a second information set, sending at least one candidate node information in the intersection set to the target client as the first target node information; if there is no intersection of the first information set and a second information set, taking at least one first candidate node information in the first information set as the first target node information. The second information set is a collection of second candidate node information corresponding to the first request information, the second candidate node information is resolved by the target client, and the second information set is sent by the target client to the first server.

The second candidate node information may be candidate node information corresponding to the first request information determined by the target client performing a Local DNS resolution. Accordingly, the second information set may be a collection of second candidate node information that may be sent by the target client to the first server along with the first domain name resolution request when the first domain name resolution request is sent to the first server.

In the above-mentioned implementation, if the target client sent the second information set to the first server when sending the first domain name resolution request, the first target node information may be determined according to the first information set sent by the second server and the second information set sent by the target client.

Exemplarily, after receiving the first information set sent by the second server, it may be judged whether there is an intersection of the first information set, and the second information set sent by the target client, i.e., whether there is the same candidate node information in the first information set and the second information set. If there is the same candidate node information in the first information set and the second information set, a preset number of candidate node information is obtained from the intersection as the first target node information corresponding to the domain name to be resolved. If the first information set and the second information set do not have the same candidate node information, a preset number of candidate node information is obtained from the first information set as the first target node information corresponding to the domain name to be resolved.

If the target client fails to perform the Local DNS resolution due to issues such as the Local DNS being hijacked by an operator or an abnormality, etc., leading to it not sending the second information set to the first server when sending the first domain name resolution request to the first server, i.e., if the first server does not receive the second information set corresponding to the first request information sent by the target client, the first server, after receiving the first information set sent by the second server, may obtain a preset number of candidate node information from the first information set as the first target node information corresponding to the domain name to be resolved, without needing to confirm whether there is an intersection between the first information set and the second information set.

In this embodiment, the first server may update the node information stored in its local cache according to a pre-set update rule. Illustratively, the first server may periodically (e.g., 10 s, 20 s, 30 s, etc.) obtain from the second server, via an asynchronous routine, an information set corresponding to a quantity of request information with the highest visit frequency, and store the obtained node information in the local cache of the first server, such as replacing the node information stored in the local cache prior to the update with the obtained node information. The method for processing a domain name resolution request provided by the embodiment may further include: updating node information stored in the first server based on an information set stored in the second server. Here, the information set corresponding to request information may be a set of node information corresponding to the request information.

In this embodiment, the first server may obtain the first information set corresponding to the first request information of the first domain name resolution request from the second server, and may update the first information set stored in the second server based on the first domain name resolution request. For example, the first server, upon receiving any one of the domain name resolution requests, may send the domain name resolution request to the third server via an asynchronous routine, in addition to obtaining the first target node information corresponding to the domain name resolution request from the first server or the second server. The third server may perform remote domain name resolution on the domain name resolution request. And the information set corresponding to the domain name resolution request stored in the second server can be updated according to the domain name resolution result of the third server, e.g., periodically sending the node information corresponding to the plurality of request information sent from the third server to the second server, and/or sending the node information corresponding to the plurality of request information sent from the third server to the second server when the number of the node information corresponding to the plurality of request information reaches a preset number, and so on.

In order to reduce the number of domain name resolution requests requiring remote domain name resolution, on the premise of guaranteeing an update requirement of node information stored in the second server, the received domain name resolution requests may be downsampled, and only the domain name resolution requests that are downsampled may be sent to the third server for remote domain name resolution, the information set including the first information set, and after the obtaining the first request information of the first domain name resolution request sent by the target client, further including: determining a target server having a mapping relationship with the first request information based on a consistent hash algorithm; in a case that the target server is the first server, processing the first domain name resolution request by a third server to obtain a first information set corresponding to the first request information; sending the first information set to the second server for storage.

Illustratively, the first server may perform a consistent hash operation on the first request information of the first domain name resolution request via an asynchronous routine to obtain a hash value of the first request information. A server identification to which the hash value corresponds in a consistent hash ring is obtained, and the server to which the server identification corresponds is taken as the server having the mapping relationship with the first request information (i.e., the target server). Determining whether the target server is the first server, and if the target server is the first server, sending the first domain name resolution request to the third server, performing remote domain name resolution on the first domain name resolution request by the third server, obtaining a first information set corresponding to the first request information, and sending the first information set to the second server for storage. For example, if an original first information set corresponding to the first request information is stored in a cache of the second server, the original first information set may be replaced with the first information set sent by the first server. If the original first information set corresponding to the first request information is not stored in the cache of the second server, the first information set may be stored directly in the second server. If the target server is not the first server, the first domain name resolution request may not be sent to the third server for remote domain name resolution.

In one implementation, the information set includes a third information set, and the method for processing a domain name resolution request provided by the present embodiment further includes: periodically processing, by the third server, a preset number of second domain name resolution requests in a preset request queue to obtain a third information set corresponding to second request information of each second domain name resolution request, where the preset request queue is used to store the preset number of second domain name resolution requests, the preset number of second domain name resolution requests being arranged in an order in which sending frequency is from low to high; sending the third information set to the second server for storage.

In the above-mentioned implementation, the domain name resolution request sent less frequently may be added to the preset request queue, and a plurality of domain name resolution requests stored in the preset request queue may be periodically sent to the third server for remote domain name resolution, so that node information corresponding to the domain name resolution request sent less frequently may be updated in time in the second server, and influence of performing consistent hash processing on the domain name resolution request sent less frequently may be reduced, thereby improving the comprehensiveness of the node information stored in the second server.

The preset request queue may be a reverse LRU queue for storing the least recently received domain name resolution requests, i.e., eliminating those domain name resolution requests that have been received more recently in recent times. Accordingly, the second domain name resolution request may be the domain name resolution request stored in the preset request queue. The plurality of second domain name resolution requests may be arranged in order in which sending frequency is from low to high in the preset request queue, and the sending frequency of a domain name resolution request (e.g., the second domain name resolution request) may be a request frequency of node information corresponding to the request information of the domain name resolution request, which may be requested by the same client or a different client corresponding to the request information. The second request information may be request information corresponding to a second domain name resolution request, and the second request information of the second domain name resolution request may include a domain name to be resolved carried in the second domain name resolution request and client information (e.g., location information and operator information) of a client sending the second target resolution request. The third information set corresponding to the second request information may be a collection of node information corresponding to the second request information.

For each of the second domain name resolution requests in the preset request queue, the first server may periodically send the second domain name resolution request to the third server via an asynchronous routine, where remote domain name resolution is performed on the second domain name resolution request by the third server, receive a third information set corresponding to second request information of the second domain name resolution request resolved by the third server, and send the second request information and the third information set to the second server. Accordingly, the second server, after receiving the third information set corresponding to the second request information sent by the first server, may store the third information set corresponding to the second request information in its cache, and may delete the original third information set corresponding to the second request information originally stored in its cache.

In one implementation, after the determining t the target server having the mapping relationship with the first request information based on the consistent hash algorithm, may further include: if the target server is the first server, and a number of second domain name resolution requests in the preset request queue is less than the preset number or a sending frequency of the first domain name resolution request is lower than a sending frequency of a target second domain name resolution request, adding the first domain name resolution request into the preset request queue, where the target second domain name resolution request is a second domain name resolution request with a highest sending frequency in the preset request queue.

In the above-mentioned implementation, the first server may update the second domain name resolution request stored in the preset request queue based on the sending frequency of the received domain name resolution requests.

The target second domain name resolution request is the second domain name resolution request in the preset queue with the highest sending frequency, such as the last second domain name resolution request in the preset request queue when the plurality of second domain name resolution requests are arranged in an order in which the sending frequency is from low to high.

For example, the first server may determine whether the number of the second domain name resolution requests in the preset request queue is less than a preset number (e.g., 200 or 500, etc.) after determining that the target server with which the first request information is mapped is the first server, and add the first domain name resolution request to the preset request queue as the second domain name resolution request if the number of the second domain name resolution requests in the preset request queue is less than the preset number. If the number of the second domain name resolution requests in the preset request queue is not less than the preset number, it may be judged whether the sending frequency of the first domain name resolution request is less than the sending frequency of the last second domain name resolution request in the preset queue (i.e., the second domain name resolution request with the highest sending frequency in the preset queue), and if the sending frequency of the first domain name resolution request is less than the sending frequency of the last second domain name resolution request in the preset queue, the last second domain name resolution request is deleted from the preset queue and the first domain name resolution request is added to the preset request queue as a second domain name resolution request; and if the sending frequency of the first domain name resolution request is not less than the sending frequency of the last second domain name resolution request in the preset queue, the first domain name resolution request may not be added to the preset request queue.

In the present embodiment, the manner of adding the first domain name resolution request as the second domain name resolution request into the preset request queue may be flexibly set, such as the first domain name resolution request may be added into a corresponding position of the preset request queue directly according to the sending frequency of the first domain name resolution request, so that the sending frequency of the first domain name resolution request after the addition is greater than or equal to the sending frequency of the second domain name resolution request located in front thereof in the preset queue, and less than or equal to the sending frequency of the second domain name resolution request located in rear thereof in the preset queue. It is also possible to add the first domain name resolution request to the last position of the preset queue as the second domain name resolution request and rearrange a plurality of second domain name resolution requests (including the added first domain name resolution request) in the preset queue in order of low to high sending frequency.

The method for processing a domain name resolution request provided by the embodiment, including: obtaining first request information of a first domain name resolution request sent by a target client, where the first request information includes a domain name to be resolved carried in the first domain name resolution request, and client information of the target client; obtaining a first information set from a second server, if it is determined that first target node information corresponding to the first request information is not stored in the first server based on the domain name to be resolved and the client information, where the first information set is a collection of first candidate node information corresponding to the first request information; taking at least one first candidate node information in the first information set as the first target node information, and sending the first target node information to the target client. The present embodiment, by adopting the above-mentioned technical solution, when the first target node information corresponding to the domain name to be resolved is not stored in the first server, determines the first target node information based on the node information stored in the second server, without relying on the resolution result of the Local DNS of the client, and without performing remote domain name resolution on the domain name to be resolved, can improve the stability when processing the domain name resolution request as well as the speed of processing the domain name resolution request, and reduce the waiting time for the client.

Figure 2:
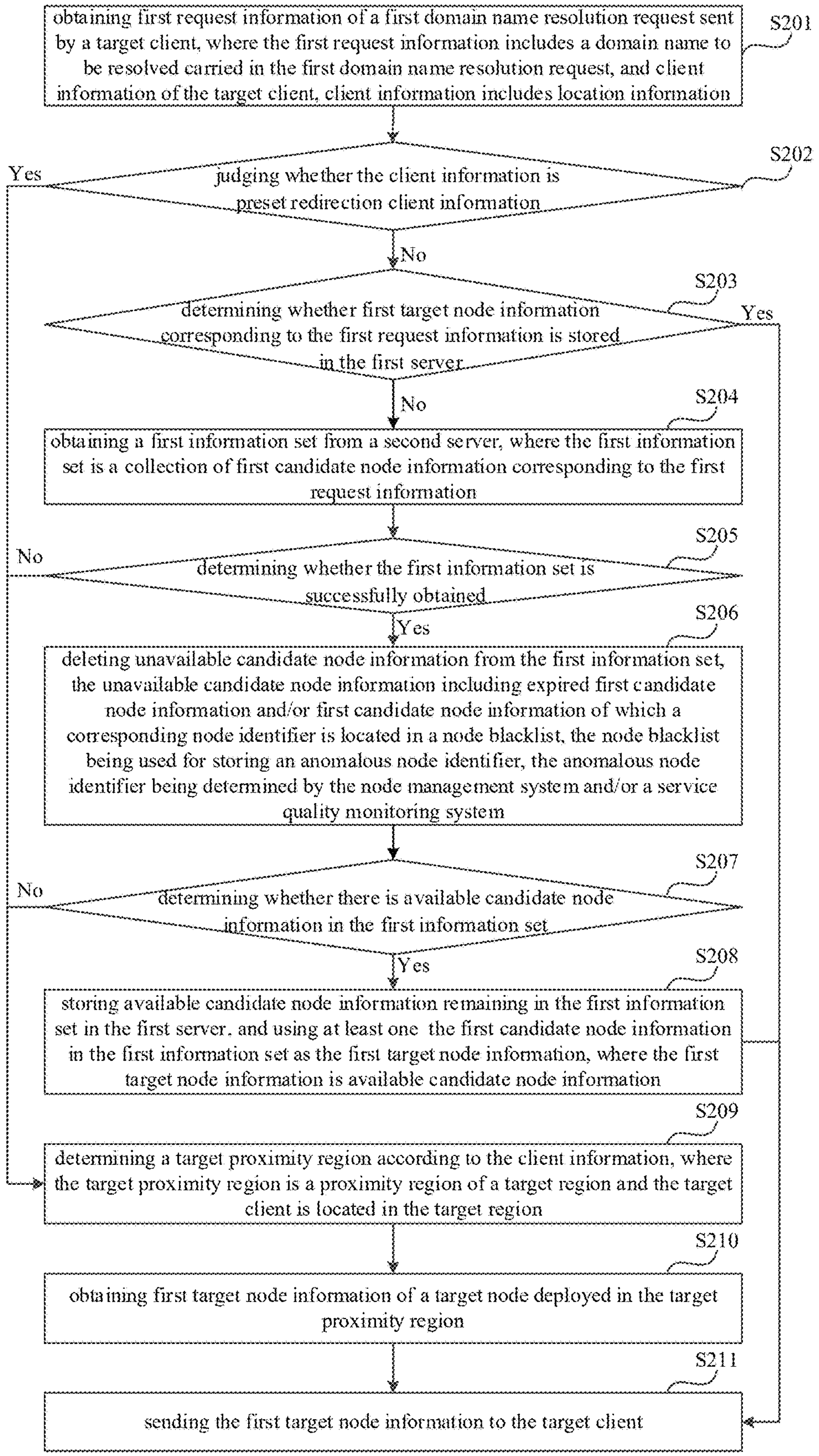
FIG. 2 is a flowchart schematic diagram of another method for processing a domain name resolution request provided by an embodiment of the present disclosure.

FIG. 2 is a flowchart schematic diagram of another method for processing a domain name resolution request provided by an embodiment of the present disclosure. The schemes in this embodiment may be combined with one or more schemes in the above-mentioned embodiments. The method for processing a domain name resolution request provided by the embodiment further includes: if it is determined that first target node information corresponding to the first request information is stored in the first server based on the domain name to be resolved and the client information, sending the first target node information to the target client.

Before the taking at least one first candidate node information in the first information set as the first target node information, the method further including: deleting unavailable candidate node information from the first information set, where the unavailable candidate node information includes expired first candidate node information and/or first candidate node information of which a corresponding node identifier is located in a node blacklist, the node blacklist being used for storing an anomalous node identifier, the anomalous node identifier being determined by a node management system and/or a service quality monitoring system.

After the deleting unavailable candidate node information from the first information set, the method further including: storing available candidate node information remaining in the first information set in the first server.

The client information includes location information, the method further including: when a first preset condition is satisfied, determining a target proximity region based on the client information, where the target proximity region is a proximity region of a target region and the target client is located in the target region; and obtaining first target node information of a target node deployed in the target proximity region, and sending the first target node information to the target client.

The first target node information is available candidate node information, and the first preset condition includes at least one of the following: the client information is preset redirection client information; failing to obtain the first information set from the second server; or no available candidate node information exists in the first information set.

Accordingly, as shown in FIG. 2, the method for processing the domain name resolution request in the present embodiment may include:

- S201: obtaining first request information of a first domain name resolution request sent by a target client, where the first request information includes a domain name to be resolved carried in the first domain name resolution request, and client information of the target client, client information includes location information.
- S202: judging whether the client information is preset redirection client information, and if the client information is preset redirection client information, proceed to S209; and if the client information is not preset redirection client information, proceed to S203.

In the present embodiment, the client information that needs to make forced redirection may be set in advance, to redirect this client information as other client information when the client information of the target client is the preset redirection client information.

The preset redirection client information may be predetermined client information for which redirection needs to be forced, such as information of an area (e.g., country or province, etc.) for which redirection needs to be forced.

Thus, after obtaining the first request information (including location information) of the first domain name resolution request, it may be judged whether the location information is location information for which redirection needs to be forced, such as judging whether the country in which the target client is located is a country for which redirection needs to be forced, and/or whether the province in which the target client is located is a province for which redirection needs to be forced. If the country in which the target client is located is a country for which redirection needs to be forced, or the province in which the target client is located is a province for which redirection needs to be forced, proceed to S209. If the country in which the target client is located is not a country in which redirection needs to be forced and the province in which the target client is located is also not a province in which redirection needs to be forced, proceed to S203.

The present embodiment may also make redirection across operators as needed, at this time, operator information that needs to force redirection may be further included in the preset redirection client information. Thus, when the operator to which the target client corresponds is an operator that needs to force the redirection, the target operator to which the redirection is to be made may be obtained, the node information corresponding to the location information of the target client, the target operator information and the domain name to be resolved is obtained as the first target node information, and sent to the target client.

S203: determining whether first target node information corresponding to the first request information is stored in the first server, and if the first target node information corresponding to the first request information is stored in the first server, proceed to S211. If the first target node information corresponding to the first request information is not stored in the first server, proceed to S204.

Exemplarily, when it is determined that the client information in the first request information does not need to force redirection, it may be judged whether node information corresponding to the first request information is stored in the local cache of the first server. If first target node information corresponding to the first request information is stored in the first server, proceed to S211 to send the first target node information stored in the local cache of the first server to the target client. If the first target node information corresponding to the first request information is not stored in the first server, proceed to S204 to obtain a first information set corresponding to the first request information from a second server.

In this embodiment, in determining whether the first target node information corresponding to the first request information is stored in the first server, the node information corresponding to the first request information may be first looked up from the local cache of the first server. If the node information corresponding to the first request information is found in the look-up, the step may be performed of determining whether the node information includes available node information, e.g., from among a plurality of node information obtained from the look-up, deleting expired node information and node information to which corresponding node identifier is located in a node blacklist, and determining whether there is remaining node information corresponding to the first request information after the deletion is completed (i.e., usable node information). If the available node information is included, obtaining (e.g., in order of visit frequency from high to low) a certain amount of node information from the available information as the first target node information, and determining that the first target node information corresponding to the first request information is stored in the first server. Accordingly, if no available node information is included or if no node information corresponding to the first request information is found, it is determined that no first target node information corresponding to the first request information is stored in the first server.

S204: obtaining a first information set from a second server, where the first information set is a collection of first candidate node information corresponding to the first request information.

S205: determining whether the first information set is successfully obtained, and if the first information set is successfully obtained, proceed to S206, and if the first information set is not successfully obtained, proceed to S209.

Exemplarily, if the first information set sent from the second server is received, it may be determined that the first information set was successfully obtained, proceed to S206; If the first information set sent from the second server is not received, it may be determined that the acquisition of the first information set has failed, proceed to S209.

S206: deleting unavailable candidate node information from the first information set, the unavailable candidate node information including expired first candidate node information and/or first candidate node information of which a corresponding node identifier is located in a node blacklist, the node blacklist being used for storing an anomalous node identifier, the anomalous node identifier being determined by the node management system and/or a service quality monitoring system.

In this embodiment, upon receiving the first information set sent by the second server, candidate node information that is unavailable in the first information set (i.e., the unavailable candidate node information) may be filtered out, e.g., expired first candidate node information in the first information set and/or first candidate node information for which the node identifier is located in a blacklist of the node, to ensure that the first target node information subsequently sent to the target client is available node information.

In this embodiment, the node management system may detect a node where an anomaly exists (i.e., an anomalous node) and report to the second server; The service quality monitoring system may detect the quality of service of each node, determine that there is an anomaly according to the quality of service of each node, and report to the second server. The second server may receive the anomalous node reported by the node management system and/or the server quality monitoring system and add the node identifier of the anomalous node to the node blacklist. Accordingly, the first server may obtain a node blacklist from the second server, and determine whether a node corresponds to the node information (e.g., first candidate node information) is an abnormal node based on the node blacklist, thereby determining whether the node information is available node information.

S207: determining whether there is available candidate node information in the first information set, if there is available candidate node information in the first information set, proceed to S208, and if there is no available candidate node information in the first information set, proceed to S209.

Exemplarily, it may be determined whether the first information set is empty after deleting the unavailable candidate node information. If the first information set is empty, it is determined that there is no available candidate node information in the first information set. If the first information set is not empty, the remaining candidate node information in the first information set is determined as available candidate node information, and it is determined that there is available candidate node information in the first information set.

S208: storing available candidate node information remaining in the first information set in the first server, and using at least one the first candidate node information in the first information set as the first target node information, where the first target node information is available candidate node information, and then performing S211.

In this embodiment, after the available node information in the first information set is obtained, the node information corresponding to the first request information may be further stored in a local cache of the first server, so that the first target node information corresponding to the first request information is directly obtained from the local cache when a domain name resolution request for obtaining the first target node information corresponding to the first request information is received again.

S209: determining a target proximity region according to the client information, where the target proximity region is a proximity region of a target region and the target client is located in the target region.

The target region may be a region in which the target client is located. The target proximity region may be a proximity region of the target region. The target region is at the same location level as the target proximity region, e.g., when the target region is a country, the target proximity region is a country adjacent to the target region. When the target region is a province in a country, the target proximity region is a province in the country that is adjacent to the target region.

The target region in which the target client is located may be determined based on client information (e.g., location information) of the target client, a list of proximity regions of the target region set in advance is obtained or a list of proximity regions of the target region is determined based on the location information, and one proximity region from the list of proximity regions is selected as the target proximity region.

In this embodiment, the selection of the target proximity region can be flexibly set, for example, one proximity region can be randomly selected from the list of proximity regions as the target proximity region. It is also possible to select one of the proximity regions having a higher visit frequency than a preset visit frequency threshold or the highest visit frequency as the target proximity region according to the visit frequency of each of the proximity regions in the list of proximity regions to ensure that a better formed node is deployed in the proximity region. The target proximity region based on the client information includes: obtaining a list of proximity regions of the target region based on the client information;; and obtaining a proximity region of which visit frequency satisfies a second preset condition from the list of proximity regions as the target proximity region.

S210: obtaining first target node information of a target node deployed in the target proximity region.

The target node may be a node corresponding to the first target node information deployed in the target proximity region.

Taking the client information including location information and operator information as an example, after the target proximity region is determined, the location information of the target client in the first request information may be replaced with the location information of the target proximity region, and S203 is performed back to obtain the first target node information corresponding to the replaced first request information, i.e., to obtain the first target node information of the target node deployed in the target proximity region.

S211: sending the first target node information to the target client.

The method for processing a domain name resolution request provided by the present embodiment can quickly drop an abnormal node on the premise of improving stability when processing a domain name resolution request, improving disaster tolerance when processing a domain name resolution request, and improving success rate when processing a domain name resolution request, by reporting an abnormal node by a node management system and/or a service quality monitoring system, and obtaining node information of a non-abnormal node corresponding to request information of a domain name resolution request in different ways.

Figure 3:
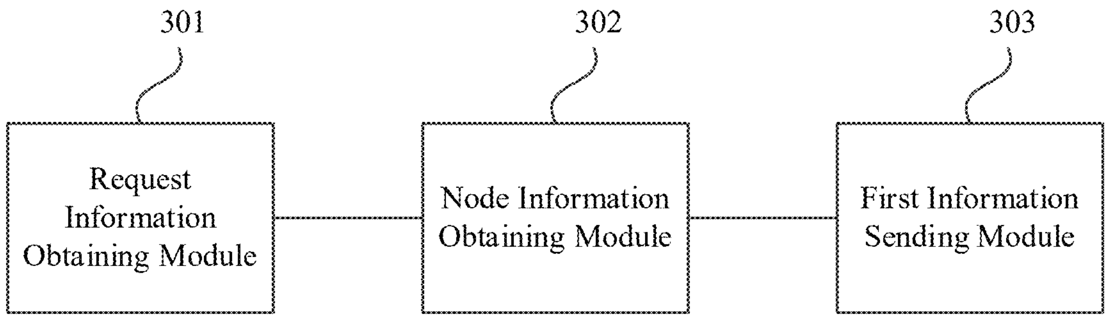
FIG. 3 is a structural block diagram of an apparatus for processing a domain name resolution request provided by an embodiment of the present disclosure.

FIG. 3 is a structural block diagram of an apparatus for processing a domain name resolution request provided by an embodiment of the present disclosure. The apparatus may be implemented by software and/or hardware, and may be configured in an electronic device. For example, the apparatus may be configured in a computer device, such as a node-preferred server, and may process a domain name resolution request by performing a method for processing the domain name resolution request. As shown in FIG. 3, the apparatus for processing the domain name resolution request provided by this embodiment may include: a request information obtaining module 301, a node information obtaining module 302 and a first information sending module 303.

The request information obtaining module 301 is configured to obtain first request information of a first domain name resolution request sent by a target client, where the first request information includes a domain name to be resolved carried in the first domain name resolution request, and client information of the target client. The node information obtaining module 302 is configured to obtain a first information set from a second server, if it is determined that first target node information corresponding to the first request information is not stored in the first server based on the domain name to be resolved and the client information, where the first information set is a collection of first candidate node information corresponding to the first request information. The first information sending module 303 is configured to take at least one first candidate node information in the first information set as the first target node information, and send the first target node information to the target client.

The apparatus for processing a domain name resolution request provided by this embodiment, obtaining first request information of a first domain name resolution request sent by a target client by the request information obtaining module 301, where the first request information includes a domain name to be resolved carried in the first domain name resolution request, and client information of the target client; obtaining a first information set from a second server by the node information obtaining module 302, in response to determining that first target node information corresponding to the first request information is not stored in the first server based on the domain name to be resolved and the client information, where the first information set is a collection of first candidate node information corresponding to the first request information; taking at least one first candidate node information in the first information set as the first target node information, and send the first target node information to the target client by the first information sending module 303. The present embodiment, by adopting the above-mentioned technical solution, when the first target node information corresponding to the domain name to be resolved is not stored in the first server, determines the first target node information based on the node information stored in the second server, without relying on the resolution result of the Local DNS of the client, and without performing remote domain name resolution on the domain name to be resolved, can improve the stability when processing the domain name resolution request as well as the speed of processing the domain name resolution request, and reduce the waiting time for the client.

The apparatus for processing the domain name resolution request provided by the present embodiment may further include: a second information sending module, configured to send the first target node information to the target client, in response to determining that first target node information corresponding to the first request information is stored in the first server based on the domain name to be resolved and the client information.

The apparatus for processing the domain name resolution request provided by the present embodiment may further include: a node information deleting module, configured to, before the taking at least one first candidate node information in the first information set as the first target node information, delete unavailable candidate node information from the first information set, where the unavailable candidate node information includes expired first candidate node information and/or first candidate node information of which a corresponding node identifier is located in a node blacklist, the node blacklist being used for storing an anomalous node identifier, the anomalous node identifier being determined by a node management system and/or a service quality monitoring system.

The apparatus for processing the domain name resolution request provided by the present embodiment may further include: a node information storage module, configured to store available candidate node information remaining in the first information set in the first server after the deleting unavailable candidate node information from the first information set.

In the above scheme, the client information may include location information, and the apparatus for processing the domain name resolution request provided by the present embodiment may further include: a proximity region determining module, configured to a target proximity region based on the client information in response to determining a first preset condition being satisfied, where the target proximity region is a proximity region of a target region and the target client is located in the target region; and a third information sending module, configured to obtain first target node information of a target node deployed in the target proximity region, and sending the first target node information to the target client.

In the above scheme, the proximity region determination module may include: a list obtaining unit, configured to obtain a list of proximity regions of the target region based on the client information; and a proximity region determining unit, configured to obtain a proximity region of which visit frequency satisfies a second preset condition from the list of proximity regions as the target proximity region.

In the above scheme, the first target node information may be available candidate node information, and the first preset condition may include at least one of the following: the client information is preset redirection client information; failing to obtain the first information set from the second server; no available candidate node information exists in the first information set.

In the above scheme, the first information sending module 303 is configured to: in a case that there is an intersection of the first information set and a second information set, send at least one candidate node information in the intersection set to the target client as the first target node information; in a case that there is no intersection of the first information set and a second information set, take at least one first candidate node information in the first information set as the first target node information; where the second information set is a collection of second candidate node information corresponding to the first request information, the second candidate node information is resolved by the target client, and the second information set is sent by the target client to the first server.

The apparatus for processing the domain name resolution request provided by the present embodiment may further include: a node information updating module, configured to update node information stored in the first server based on an information set stored in the second server.

In the above scheme, the information set may include the first information set, and the apparatus for processing the domain name resolution request provided by the embodiment may further include: a mapping module, configured to, after the obtaining first request information of the first domain name resolution request sent by the target client, a target server having a mapping relationship with the first request information based on a consistent hash algorithm; a first request processing module, configured to process the first domain name resolution request by a third server to obtain a first information set corresponding to the first request information in response to a case where the target server is the first server; and a fourth information sending module, configured to send the first information set to the second server for storage.

In the above scheme, the information set may include a third information set, and the apparatus for processing the domain name resolution request provided by the present embodiment may further include: a second request processing module, configured to periodically process, by the third server, a preset number of second domain name resolution requests in a preset request queue to obtain a third information set corresponding to second request information of each second domain name resolution request, where the preset request queue is used to store the preset number of second domain name resolution requests, the preset number of second domain name resolution requests being arranged in an order in which sending frequency is from low to high; and a fifth information sending module, configured to send the third information set to the second server for storage.

The apparatus for processing the domain name resolution request provided by the present embodiment may further include: a request adding module, configured to, after the determining the target server having the mapping relationship with the first request information based on the consistent hash algorithm, add the first domain name resolution request into the preset request queue if the target server is the first server, and a number of second domain name resolution requests in the preset request queue is less than the preset number or a sending frequency of the first domain name resolution request is lower than a sending frequency of a target second domain name resolution request, where the target second domain name resolution request is a second domain name resolution request with a highest sending frequency in the preset request queue.

The domain name resolving apparatus provided by the embodiments of the present disclosure can perform the method for processing a domain name resolution request provided by any of the embodiments of the present disclosure, and is provided with functional modules and effects corresponding to the method for processing a domain name resolution request. Technical details, which are not elaborately described in this embodiment, may be referred to the method for processing the domain name resolution request provided by any embodiment of the present disclosure.

Figure 4:
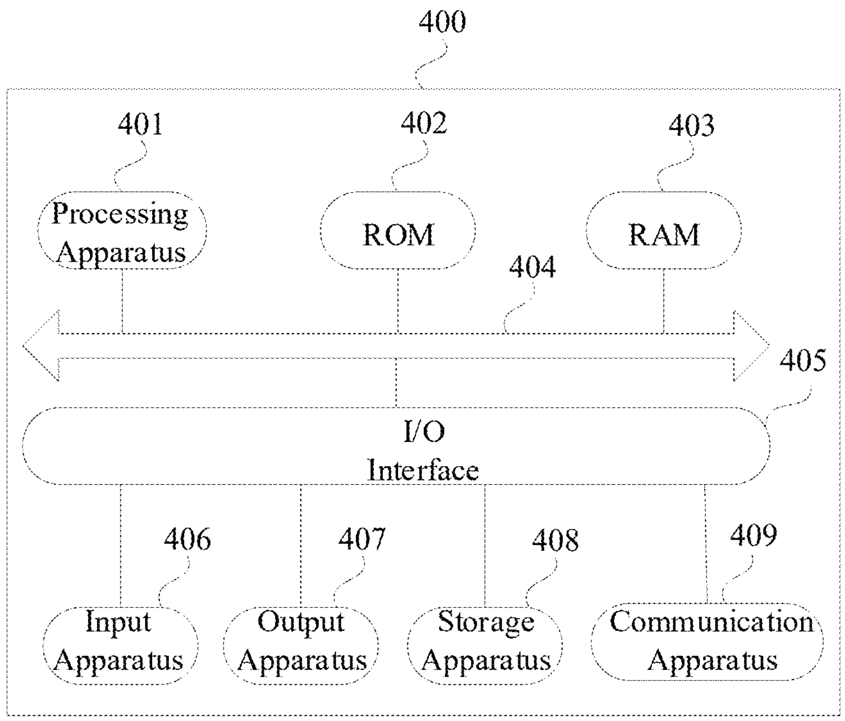
FIG. 4 is a structural schematic diagram of an electronic device provided by an embodiment of the present disclosure.

Referring to FIG. 4, FIG. 4 illustrates a schematic structural diagram of an electronic device (e.g., a server) 400 suitable for implementing the embodiments of the present disclosure. The terminal devices in the embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal) or the like, and fixed terminals such as a digital Television (TV), a desktop computer, or the like. The electronic device 400 illustrated in FIG. 4 is merely an example, and should not pose any limitation to the functions and the range of use of the embodiments of the present disclosure.

As illustrated in FIG. 4, the electronic device 400 may include a processing apparatus 401 (e.g., a central processing unit, a graphics processing unit, etc.), which can perform various suitable actions and processing according to a program stored in a read-only memory (ROM) 402 or a program loaded from a storage apparatus 408 into a random-access memory (RAM) 403. The RAM 403 further stores various programs and data required for operations of the electronic device 400. The processing apparatus 401, the ROM 402, and the RAM 403 are interconnected through a bus 404. An input/output (I/O) interface 405 is also connected to the bus 404.

Usually, the following apparatuses may be connected to the I/O interface 405: an input apparatus 406 including, for example, a touch screen, a touch pad, a keyboard, a mouse, a camera, a microphone, an accelerometer, a gyroscope, or the like; an output apparatus 407 including, for example, a liquid crystal display (LCD), a loudspeaker, a vibrator, or the like; a storage apparatus 408 including, for example, a magnetic tape, a hard disk, or the like; and a communication apparatus 409. The communication apparatus 409 may allow the electronic device 400 to be in wireless or wired communication with other devices to exchange data. While FIG. 4 illustrates the electronic device 400 having various apparatuses, it is not required that all of the illustrated apparatuses be implemented or included. More or fewer apparatuses may be implemented or included alternatively.

According to the embodiments of the present disclosure, the processes described above with reference to the flowcharts may be implemented as a computer software program. For example, the embodiments of the present disclosure include a computer program product, which includes a computer program carried by a non-transitory computer-readable medium. The computer program includes program code for performing the methods shown in the flowcharts. In such embodiments, the computer program may be downloaded online through the communication apparatus 409 and installed, or may be installed from the storage apparatus 408, or may be installed from the ROM 402. When the computer program is executed by the processing apparatus 401, the above-mentioned functions defined in the methods of some embodiments of the present disclosure are performed.

The above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be sent by using any suitable medium, including but not limited to an electric wire, a fiber-optic cable, radio frequency (RF) and the like, or any appropriate combination of them.

In some implementations, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs which, and when the one or more programs are executed by the electronic device, the electronic device is caused to: first request information of a first domain name resolution request sent by a target client, where the first request information includes a domain name to be resolved carried in the first domain name resolution request, and client information of the target client; obtain a first information set from a second server, if it is determined that first target node information corresponding to the first request information is not stored in the first server based on the domain name to be resolved and the client information, where the first information set is a collection of first candidate node information corresponding to the first request information; take at least one first candidate node information in the first information set as the first target node information, and send the first target node information to the target client.

The computer program code for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, function, and operation of possible implementations of systems, methods, and computer program products according to various embodiments of the present disclosure. In this regard, each block in the flowcharts or block diagrams may represent a module, a program segment, or a portion of code, including one or more executable instructions for implementing specified logical functions. It should also be noted that, in some alternative implementations, the functions noted in the blocks may also occur out of the order noted in the drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules involved in the embodiments of the present disclosure may be implemented in software or hardware. Among them, the name of the module does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, example 1provides a method for processing a domain name resolution request, performed by a first server, including:

obtaining first request information of a first domain name resolution request sent by a target client, where the first request information includes a domain name to be resolved carried in the first domain name resolution request, and client information of the target client;

obtaining a first information set from a second server, if it is determined that first target node information corresponding to the first request information is not stored in the first server based on the domain name to be resolved and the client information, where the first information set is a collection of first candidate node information corresponding to the first request information;

taking at least one first candidate node information in the first information set as the first target node information, and sending the first target node information to the target client.

According to one or more embodiments of the present disclosure, the method in example 2 according to example 1, further including:

sending the first target node information to the target client, if it is determined that first target node information corresponding to the first request information is stored in the first server based on the domain name to be resolved and the client information.

According to one or more embodiments of the present disclosure, the method in example 3 according to example 1, before the taking at least one first candidate node information in the first information set as the first target node information, further including:

deleting unavailable candidate node information from the first information set, where the unavailable candidate node information includes expired first candidate node information and/or first candidate node information of which a corresponding node identifier is located in a node blacklist, the node blacklist being used for storing an anomalous node identifier, the anomalous node identifier being determined by a node management system and/or a service quality monitoring system.

According to one or more embodiments of the present disclosure, the method in example 4 according to example 3, after the deleting unavailable candidate node information from the first information set, further including:

storing available candidate node information remaining in the first information set in the first server.

According to one or more embodiments of the present disclosure, the method in example 5 according to example 3, where the client information includes location information, and the method further includes:

determining a target proximity region based on the client information in response to determining a first preset condition being satisfied, where the target proximity region is a proximity region of a target region and the target client is located in the target region; and obtaining first target node information of a target node deployed in the target proximity region, and sending the first target node information to the target client.

According to one or more embodiments of the present disclosure, the method in example 6 according to example 5, where the determining the target proximity region based on the client information includes:

obtaining a list of proximity regions of the target region based on the client information; and obtaining a proximity region of which visit frequency satisfies a second preset condition from the list of proximity regions as the target proximity region.

According to one or more embodiments of the present disclosure, the method in example 7 according to example 5, where the first target node information is available candidate node information, and the first preset condition includes at least one of the following:

the client information is preset redirection client information;

failing to obtain the first information set from the second server; or no available candidate node information exists in the first information set.

According to one or more embodiments of the present disclosure, the method in example 8 according to example 1, where the taking at least one first candidate node information in the first information set as the first target node information includes:

in a case that there is an intersection of the first information set and a second information set, sending at least one candidate node information in the intersection set to the target client as the first target node information; and in a case that there is no intersection of the first information set and a second information set, taking at least one first candidate node information in the first information set as the first target node information;

where the second information set is a collection of second candidate node information corresponding to the first request information, the second candidate node information is resolved by the target client, and the second information set is sent by the target client to the first server.

According to one or more embodiments of the present disclosure, the method in example 9 according to any one of examples 1-8, further including:

updating node information stored in the first server based on an information set stored in the second server.

According to one or more embodiments of the present disclosure, the method in example 10 according to example 9, where the information set includes the first information set, after the obtaining first request information of the first domain name resolution request sent by the target client, the method further includes:

determining a target server having a mapping relationship with the first request information based on a consistent hash algorithm;

in a case that the target server is the first server, processing the first domain name resolution request by a third server to obtain a first information set corresponding to the first request information; and sending the first information set to the second server for storage.

According to one or more embodiments of the present disclosure, the method in example 11 according to example 10, where the information set includes a third information set, and the method further includes:

periodically processing, by the third server, a preset number of second domain name resolution requests in a preset request queue to obtain a third information set corresponding to second request information of each second domain name resolution request, where the preset request queue is used to store the preset number of second domain name resolution requests, the preset number of second domain name resolution requests being arranged in an order in which sending frequency is from low to high; and sending the third information set to the second server for storage.

According to one or more embodiments of the present disclosure, the method in example 12 according to example 11, where, after the determining the target server having the mapping relationship with the first request information based on the consistent hash algorithm, the method further includes:

in a case that the target server is the first server, and a number of second domain name resolution requests in the preset request queue is less than the preset number or a sending frequency of the first domain name resolution request is lower than a sending frequency of a target second domain name resolution request, adding the first domain name resolution request into the preset request queue, where the target second domain name resolution request is a second domain name resolution request with a highest sending frequency in the preset request queue.

According to one or more embodiments of the present disclosure, example 13 provides an apparatus for processing a domain name resolution request, configured in a first server, including:

a request information obtaining module, configured to obtain first request information of a first domain name resolution request sent by a target client, where the first request information includes a domain name to be resolved carried in the first domain name resolution request, and client information of the target client;

a node information obtaining module, configured to obtain a first information set from a second server, in response to determining that first target node information corresponding to the first request information is not stored in the first server based on the domain name to be resolved and the client information, where the first information set is a collection of first candidate node information corresponding to the first request information;

a first information sending module, configured to take at least one first candidate node information in the first information set as the first target node information, and send the first target node information to the target client.

According to one or more embodiments of the present disclosure, example 14 provides an electronic device, including:

one or more processors;

a memory configured to store one or more programs, where, the memory stores a computer program executable by the at least one processor, the computer program being executed by the at least one processor to enable the at least one processor to perform the method for processing a domain name resolution request according to any one of examples 1 to 12.

According to one or more embodiments of the present disclosure, example 15 provides a computer readable storage medium having stored thereon a computer program, which when executed by a processor, implements the method for processing a domain name resolution request of any one of examples 1-12.

According to one or more embodiments of the present disclosure, example 16 provides a computer program product which, when executed by a computer, causes the computer to implement the method for processing a domain name resolution request according to any one of examples 1-12.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

The invention claimed is:

1. A method for processing a domain name resolution request, performed by a first server, comprising:

obtaining first request information of a first domain name resolution request sent by a target client, wherein the first request information comprises a domain name to be resolved carried in the first domain name resolution request, and client information of the target client;

obtaining a first information set from a second server, in response to determining that first target node information corresponding to the first request information is not stored in the first server based on the domain name to be resolved and the client information, wherein the first information set is a collection of first candidate node information corresponding to the first request information;

taking at least one first candidate node information in the first information set as the first target node information, and sending the first target node information to the target client;

wherein the method further comprises:

periodically processing, by a third server, a preset number of second domain name resolution requests in a preset request queue to obtain a second information set corresponding to second request information of each second domain name resolution request, wherein the preset request queue is configured to store the preset number of second domain name resolution requests, the preset number of second domain name resolution requests being arranged in an order in which sending frequency is from low to high; and sending the second information set to the second server for storage.

2. The method according to claim 1, further comprising:

sending the first target node information to the target client, in response to determining that first target node information corresponding to the first request information is stored in the first server based on the domain name to be resolved and the client information.

3. The method according to claim 1, before the taking at least one first candidate node information in the first information set as the first target node information, further comprising:

deleting unavailable candidate node information from the first information set, wherein the unavailable candidate node information comprises at least one of expired first candidate node information or first candidate node information of which a corresponding node identifier is located in a node blacklist, the node blacklist being used for storing an anomalous node identifier, the anomalous node identifier being determined by at least one of a node management system or a service quality monitoring system.

4. The method according to claim 3, after the deleting unavailable candidate node information from the first information set, further comprising:

storing available candidate node information remaining in the first information set in the first server.

5. The method according to claim 3, wherein the client information comprises location information, and the method further comprises:

determining a target proximity region based on the client information in response to determining a first preset condition being satisfied, wherein the target proximity region is a proximity region of a target region and the target client is located in the target region; and obtaining first target node information of a target node deployed in the target proximity region, and sending the first target node information to the target client.

6. The method according to claim 5, wherein the determining the target proximity region based on the client information comprises:

obtaining a list of proximity regions of the target region based on the client information; and obtaining a proximity region of which visit frequency satisfies a second preset condition from the list of proximity regions as the target proximity region.

7. The method according to claim 5, wherein the first target node information is available candidate node information, and the first preset condition comprises at least one of the following:

the client information is preset redirection client information;

failing to obtain the first information set from the second server; or no available candidate node information exists in the first information set.

8. The method according to claim 1, wherein the taking at least one first candidate node information in the first information set as the first target node information comprises:

in a case that there is an intersection of the first information set and a second third information set, sending at least one candidate node information in the intersection set to the target client as the first target node information; and in a case that there is no intersection of the first information set and a second the third information set, taking at least one first candidate node information in the first information set as the first target node information;

wherein the second third information set is a collection of second candidate node information corresponding to the first request information, the second candidate node information is resolved by the target client, and the second third information set is sent by the target client to the first server.

9. The method according to claim 1, further comprising:

updating node information stored in the first server based on an information set stored in the second server.

10. The method according to claim 9, wherein the information set comprises the first information set, after the obtaining first request information of the first domain name resolution request sent by the target client, the method further comprises:

determining a target server having a mapping relationship with the first request information based on a consistent hash algorithm;

in a case that the target server is the first server, processing the first domain name resolution request by the third server to obtain a first information set corresponding to the first request information; and sending the first information set to the second server for storage.

11. The method according to claim 10, wherein, after the determining the target server having the mapping relationship with the first request information based on the consistent hash algorithm, the method further comprises:

in a case that the target server is the first server, and a number of second domain name resolution requests in the preset request queue is less than the preset number or a sending frequency of the first domain name resolution request is lower than a sending frequency of a target second domain name resolution request, adding the first domain name resolution request into the preset request queue, wherein the target second domain name resolution request is a second domain name resolution request with a highest sending frequency in the preset request queue.

12. An electronic device, comprising:

at least one processor; and a memory communicatively connected with the at least one processor; wherein, the memory stores a computer program executable by the at least one processor, the computer program being executed by the at least one processor to enable the at least one processor to perform operations, and the method operations comprise:

obtaining first request information of a first domain name resolution request sent by a target client, wherein the first request information comprises a domain name to be resolved carried in the first domain name resolution request, and client information of the target client;

obtaining a first information set from a second server, in response to determining that first target node information corresponding to the first request information is not stored in the first server based on the domain name to be resolved and the client information, wherein the first information set is a collection of first candidate node information corresponding to the first request information;

taking at least one first candidate node information in the first information set as the first target node information, and sending the first target node information to the target client;

wherein the operations further comprise:

periodically processing, by a third server, a preset number of second domain name resolution requests in a preset request queue to obtain a second information set corresponding to second request information of each second domain name resolution request, wherein the preset request queue is configured to store the preset number of second domain name resolution requests, the preset number of second domain name resolution requests being arranged in an order in which sending frequency is from low to high; and sending the second information set to the second server for storage.

13. A non-transitory computer readable storage medium storing computer instructions, wherein the computer instructions, when executed by a processor, implements operations, and the operations comprise:

obtaining first request information of a first domain name resolution request sent by a target client, wherein the first request information comprises a domain name to be resolved carried in the first domain name resolution request, and client information of the target client;

obtaining a first information set from a second server, in response to determining that first target node information corresponding to the first request information is not stored in the first server based on the domain name to be resolved and the client information, wherein the first information set is a collection of first candidate node information corresponding to the first request information;

taking at least one first candidate node information in the first information set as the first target node information, and sending the first target node information to the target client;

wherein the operations further comprise:

periodically processing, by a third server, a preset number of second domain name resolution requests in a preset request queue to obtain a second information set corresponding to second request information of each second domain name resolution request, wherein the preset request queue is configured to store the preset number of second domain name resolution requests, the preset number of second domain name resolution requests being arranged in an order in which sending frequency is from low to high; and sending the second information set to the second server for storage.

14. The electronic device according to claim 12, wherein the operations further comprise:

sending the first target node information to the target client, in response to determining that first target node information corresponding to the first request information is stored in the first server based on the domain name to be resolved and the client information.

15. The electronic device according to claim 12, wherein, before the taking at least one first candidate node information in the first information set as the first target node information, the operations further comprise:

deleting unavailable candidate node information from the first information set, wherein the unavailable candidate node information comprises at least one of expired first candidate node information or first candidate node information of which a corresponding node identifier is located in a node blacklist, the node blacklist being used for storing an anomalous node identifier, the anomalous node identifier being determined by at least one of a node management system or a service quality monitoring system.

16. The electronic device according to claim 15, wherein, after the deleting unavailable candidate node information from the first information set, the operations further comprise:

storing available candidate node information remaining in the first information set in the first server.

17. The electronic device according to claim 15, wherein the client information comprises location information, and the operations further comprise:

determining a target proximity region based on the client information in response to determining a first preset condition being satisfied, wherein the target proximity region is a proximity region of a target region and the target client is located in the target region; and obtaining first target node information of a target node deployed in the target proximity region, and sending the first target node information to the target client.

18. The electronic device according to claim 12, wherein the taking at least one first candidate node information in the first information set as the first target node information comprises:

in a case that there is an intersection of the first information set and a third information set, sending at least one candidate node information in the intersection set to the target client as the first target node information; and in a case that there is no intersection of the first information set and the third information set, taking at least one first candidate node information in the first information set as the first target node information;

wherein the third information set is a collection of second candidate node information corresponding to the first request information, the second candidate node information is resolved by the target client, and the third information set is sent by the target client to the first server.

19. The electronic device according to claim 12, wherein the operations further comprise:

updating node information stored in the first server based on an information set stored in the second server.

20. The non-transitory computer readable storage medium according to claim 13, the operations further comprising: updating node information stored in the first server based on an information set stored in the second server.

* * * * *